United States Patent [19]
Guetersloh

[11] Patent Number: 5,302,174
[45] Date of Patent: Apr. 12, 1994

[54] MULTI-UNIT GREASE FILTER

[75] Inventor: Timothy L. Guetersloh, Deerfield, Wis.

[73] Assignee: Research Products Corporation, Madison, Wis.

[21] Appl. No.: 88,443

[22] Filed: Jul. 7, 1993

[51] Int. Cl.⁵ .............................................. B01D 45/00
[52] U.S. Cl. ........................................ 55/444; 55/464; 55/DIG. 36
[58] Field of Search ................... 55/442–446, 55/462, 463, 464, DIG. 36; 126/299 D

[56] References Cited

U.S. PATENT DOCUMENTS

| | | | |
|---|---|---|---|
| 3,834,135 | 9/1974 | Jordan | 55/444 |
| 3,870,494 | 3/1975 | Doane | 55/443 |
| 3,952,640 | 4/1976 | Kuechler | 55/DIG. 36 X |
| 4,944,782 | 7/1990 | Raiendvan et al. | 55/444 |

Primary Examiner—Charles Hart
Attorney, Agent, or Firm—Andrus, Sceales, Starke & Sawall

[57] ABSTRACT

A multi-unit grease filter includes a first filter unit and a second filter unit, each having an upstream series of spaced apart elongated baffles and a downstream series of spaced apart elongated baffles offset from the upstream series of baffles so that the baffles overlap and expose the air to multiple surfaces as it travels through the filter. The baffles have their ends connected to a pair of end frame members, each of which has at least one spacer in the form of a side edge having a first portion co-extensive with the upstream series of baffles and a second portion co-extensive with the downstream series of baffles so as to provide an off-set in each of the end frame members so that when the first and second filter units are disposed in abutment side by side, the off-sets align and overlap so that a bifurcated seam line is formed at the abutment and a downstream baffle overlaps with an upstream baffle at the seam line.

6 Claims, 2 Drawing Sheets

MULTI-UNIT GREASE FILTER

BACKGROUND OF THE INVENTION

The present invention relates to multi-unit grease filters and more specifically to grease filters of the type in which a plurality of substantially rectangular filter frames are disposed side by side with each of the frames containing a plurality of elongated overlapping arcuate baffles so that air passing through the filter encounters a plurality of curved surfaces. Prior art baffle-type grease filters such as that shown in FIG. 2 utilize a plurality of offset elongated baffles contained within a frame. A number of frames are then placed side by side to form a filter bank in the exhaust hood of a grill.

When the prior art filter units were placed side by side in the filter bank, the framework edges would abut and form a dead area in the filter bank that would collect grease that could not be drained to the collecting pan. Also, the straight seam line formed by the abutment of the two filter unit frames would create a leak path for the air flow which reduces the efficiency of the filter. This straight seam line also rendered the baffles near the frame edges non-functional since it disrupted the uniform air flow through the filter.

It is an object of the present invention to provide a multi-unit grease filter that eliminates the dead spot typically located at the abutment of two filter units and also eliminates the "straight line" leak path which was disruptive of the air flow at the abutment of two filter units.

SUMMARY OF THE INVENTION

A multi-unit grease filter includes a first filter unit and a second filter unit, each of which has an upstream series of spaced apart elongated arcuate baffles and a downstream series of spaced apart elongated arcuate baffles offset from the upstream series of baffles so that the baffles overlap and expose the air flow to multiple curved surfaces.

In accordance with one aspect of the invention, the elongated baffles in the first and second filter units are disposed between and connected to two end frame members.

In accordance with another aspect of the invention, each of the end frame members has at least one spacing means in the form of a side edge having a first portion co-extensive with the upstream series of baffles and a second portion co-extensive with the downstream series of baffles so as to provide an off-set in each of the end frame members.

In accordance with yet another aspect of the invention, the first and second filter units are disposed in abutment side by side with said end frame member off-sets aligning and overlapping so that a bifurcated seam line is formed at the abutment of the end frame members and a downstream baffle overlaps an upstream baffle at the seam line.

The present invention thus provides a multi-unit grease filter that eliminates the dead spot typically located at the abutment of two filter units and also eliminates the "straight line" leak path typically formed at the abutment of two filter units.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
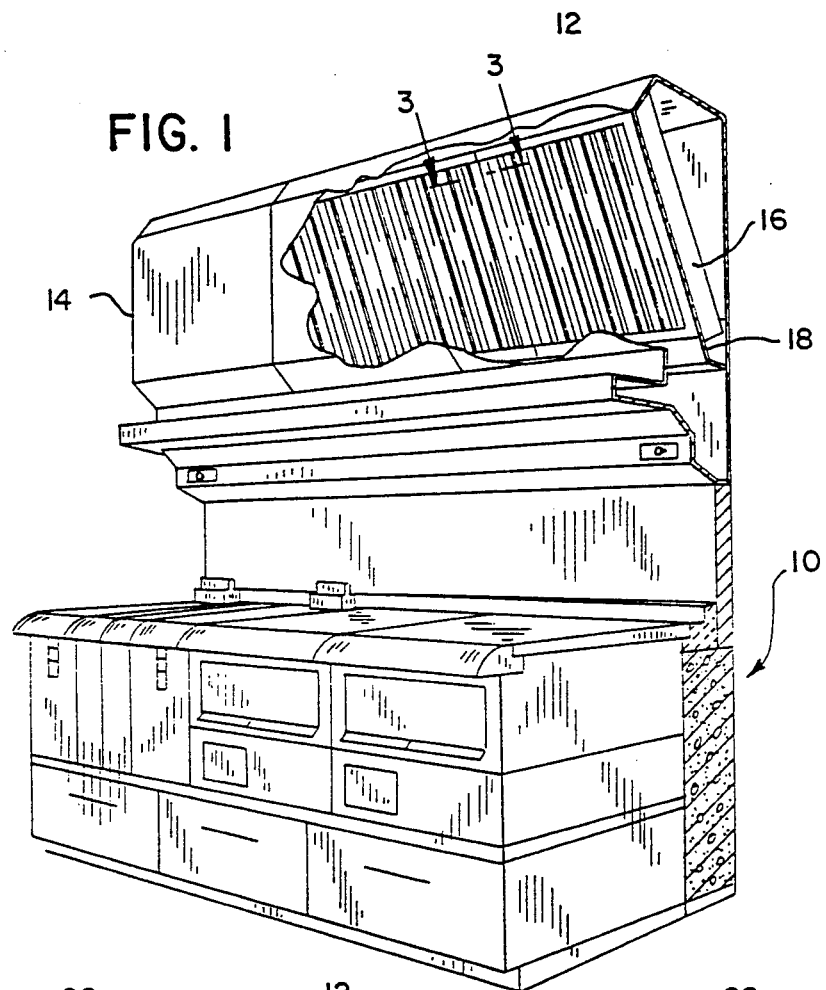
FIG. 1 is a perspective view of a grill and exhaust system utilizing the grease filter of the present invention.

FIG. 1 illustrates a grill 10 in which a baffle-type grease filter 12 has been disposed within the grill hood 14.

Grease filter 12 is disposed within an angularly mounted frame 16 that allows grease collected on the baffles to drain to a collection pan 18.

Grease filter 12 consists of a number of substantially rectangular units mounted side by side within framework 16.

Figure 2:
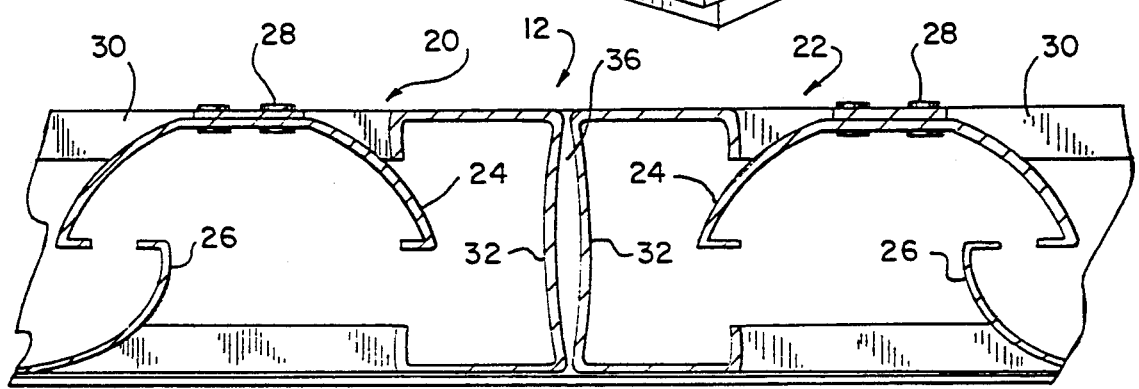
FIG. 2 is an end cross-sectional view of a prior ar-t multi-unit grease filter.

FIG. 2 illustrates a pair of prior art filter units 20 and 22 that have been mounted side by side. In this prior art method of assembling grease filter 12, each of the filter units 20 and 22 had a series of elongated spaced apart upstream baffles 24 and a series of elongated downstream baffles 26 that were offset from upstream baffles 24 so that air passing through grease filter 12 would encounter a series of cur,.,ed surfaces that would force the grease laden air to change direction as it passed through the filter. The heavier than air grease particles would then become impinged on the baffle surfaces as the air changed directions and passed through. The prior art baffles were connected at their ends by rivets 28 to an end plate 30. The sides of end plates 30 terminated in a wall 32. Thus when the prior art filter units 20 and 22 were slid into abutment with each other, a dead zone 34 was created and a straight seam line 36 offered a leak path to the exhaust air. Straight seam line 36 reduced the efficiency of grease filter 12 since it disrupted the uniform air flow through the filter and thus rendered the baffles adjacent the seam line non-functional. The seam area also presented an unwanted surface for the collection of grease and negatively impacted on the aesthetics of the grease filter.

Figure 3:
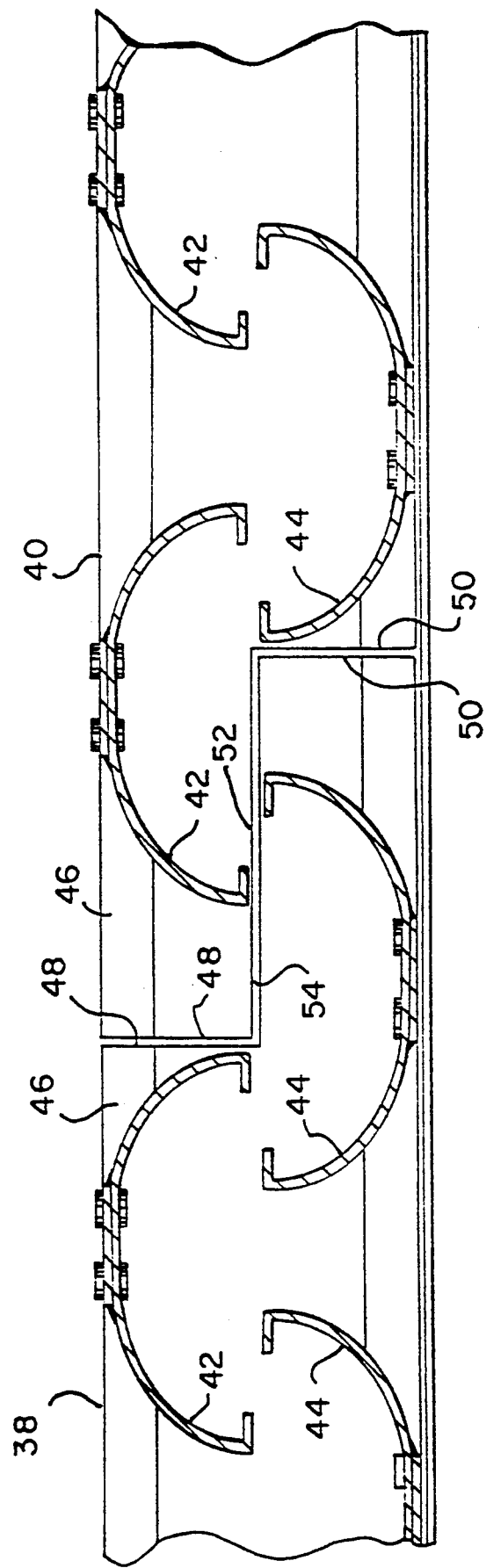
FIG. 3 is a sectional view along the line 3—3 of FIG. 1.

As illustrated in FIG. 3, the present invention utilizes a first filter unit 38 and a second filter unit 40, each of which has a series of upstream spaced apart elongated arcuate baffles 42 and a downstream series of spaced apart elongated arcuate baffles 44 that are offset from upstream baffles 42 so that the baffles overlap and expose the air flow to multiple curved surfaces as it flows through the filter.

Elongated baffles 42 and 44 are disposed between and connected to a pair of end frame members 46. FIG. 3 illustrates only one end frame member, but it is to be understood that the other end of baffles 42 and 44 is connected to an identical end frame member.

Each of end frame members 46 has spacing means in the form of a side edge having a first portion 48 that is co-extensive with the upstream series of baffles and a second portion 50 that is co-extensive with the downstream series of baffles so as to provide an off-set 52 in each of end frame members 46. Thus when first frame member 38 is placed in abutment side by side with second filter unit 40, off-sets 52 align and overlap so that a bifurcated seam line 54 is formed at the abutment and a downstream baffle 42 will overlap with an upstream baffle 44 at seam line 54.

The present invention thus eliminates dead zone 34 that was present in the prior art side by side filter units and also eliminates the straight path seam line 36 that was created when the prior art filter units were placed side by side.

Various modes of carrying out the invention are contemplated as being within the scope of the following claims particularly pointing out and distinctly claiming the subject matter regarded as the invention.

I claim:

1. A multi-unit grease filter of the type in which a plurality of substantially rectangular filter frames are disposed side by side with each of the frames containing a plurality of elongated overlapping baffles so that air passing through the filter encounters a plurality of surfaces causing the air to change directions, said filter comprising:

a first filter unit and a second filter unit, each having an upstream series of spaced apart elongated baffles and a downstream series of spaced apart elongated baffles offset from said upstream series of baffles so that the baffles overlap and expose the air flow to multiple surfaces, said elongated baffles in said first and second filter units being disposed between and connected to two end frame members, said end frame members having spacing means whereby said first and second filter units may be disposed side by side with said end frame members in abutment and with a downstream baffle of one of said filter units overlapping an upstream baffle of the other of said filter units.

2. The grease filter defined in claim 1 wherein said spacing means comprises:

a first edge portion on each of said end frame members co-extensive with said upstream series of baffles and a second edge portion on each of said end frame members co-extensive with said downstream series of baffles so as to provide an off-set in each of said end frame members so that when said first and second filter units are disposed side by side, said off-sets align and overlap so that a bifurcated seam line is formed at the abutment of said end frame members.

3. The grease filter defined in claim I wherein said baffles are arcuate in shape whereby the air flowing through the filter is exposed to multiple curved surfaces.

4. The grease filter defined in claim I wherein each side edge of said first and second filter units has a first portion co-extensive with said upstream series of baffles and a second portion co-extensive with said downstream series of baffles so as to provide an off-set at both sides of each of said end frame members.

5. The grease filter defined in claim 2 further comprising additional filter units configured substantially identical to said first and second filter units and disposed in abutment side by side with said first and second filter units.

6. A multi-unit grease filter of the type in which a plurality of substantially rectangular filter frames are disposed side by side with each of the frames containing a plurality of elongated overlapping baffles so that air passing through the filter encounters a plurality of surfaces causing the air to change directions, said filter comprising:

a first filter unit and a second filter unit, each having an upstream series of spaced apart elongated arcuate baffles and a downstream series of spaced apart elongated arcuate baffles offset from said upstream series of baffles so that the baffles overlap and expose the air flow to multiple curved surfaces, said elongated baffles in said first and second filter units being disposed between and connected to two end frame members, each of said end frame members having at least one side edge having a first portion co-extensive with said upstream series of baffles and a second portion co-extensive with said downstream series of baffles so as to provide an off-set in each of said end frame members, said first and second filter units disposed in abutment side by side with said end frame member notches aligning and overlapping so that a bifurcated seam line is formed at the abutment of said end frame members and a downstream baffle overlaps an upstream baffle at the seam line.

* * * * *